(12) United States Patent
Knighton et al.

(10) Patent No.: US 7,995,834 B1
(45) Date of Patent: Aug. 9, 2011

(54) MULTIPLE LASER SCANNER

(75) Inventors: Mark S. Knighton, Santa Monica, CA (US); David S. Agabra, Pacific Palisades, CA (US); Vlad Constantin Cardei, Marina Del Rey, CA (US); Jeremy A. Millers, Manhattan Beach, CA (US); Mark A. Feeney, Sunland, CA (US); William D. McKinley, Los Angeles, CA (US)

(73) Assignee: NextEngine, Inc., Santa Monica, CA (US)

( * ) Notice: Subject to any disclaimer, the term of this patent is extended or adjusted under 35 U.S.C. 154(b) by 1365 days.

(21) Appl. No.: 11/336,216

(22) Filed: Jan. 20, 2006

(51) Int. Cl.
*G06K 9/00* (2006.01)
*G01B 11/30* (2006.01)
*H01J 3/14* (2006.01)

(52) U.S. Cl. .................... 382/154; 250/234; 356/607

(58) Field of Classification Search .............. 382/106, 382/154, 276, 285–286; 348/42, 128; 356/376, 356/394, 425; 250/559.23, 59.31
See application file for complete search history.

(56) References Cited

U.S. PATENT DOCUMENTS

| | | | |
|---|---|---|---|
| 3,636,250 A | 1/1972 | Haeff | |
| 3,913,582 A | 10/1975 | Sharon | |
| 4,089,608 A | 5/1978 | Hoadley | |
| 4,165,530 A | 8/1979 | Sowden | |
| 4,302,097 A | 11/1981 | Chlestil | |
| 4,404,594 A | 9/1983 | Hannan | |
| 4,532,605 A | 7/1985 | Waller | |
| 4,564,295 A | 1/1986 | Halioua | |
| 4,590,608 A | 5/1986 | Chen et al. | |
| 4,622,462 A * | 11/1986 | Eaton et al. | 250/236 |
| 4,627,734 A * | 12/1986 | Rioux | 356/607 |
| 4,637,773 A | 1/1987 | Nakashima et al. | |
| 4,641,972 A | 2/1987 | Halioua et al. | |
| 4,657,394 A | 4/1987 | Halioua | |
| 4,693,663 A | 9/1987 | Brenholt et al. | |
| 4,705,401 A | 11/1987 | Addleman et al. | |
| 4,724,525 A | 2/1988 | Purcell et al. | |
| 4,737,032 A | 4/1988 | Addleman et al. | |
| 4,802,759 A | 2/1989 | Matsumoto et al. | |
| 4,846,577 A | 7/1989 | Grindon | |
| 5,016,153 A | 5/1991 | Gismondi et al. | |
| 5,056,914 A | 10/1991 | Kollodge | |
| 5,067,817 A | 11/1991 | Glenn | |

(Continued)

OTHER PUBLICATIONS

Clark, J.; Trucco, E.; Cheung, H.-F., "Improving laser triangulation sensors using polarization," Computer Vision, 1995. Proceedings., Fifth International Conference on , vol., no., pp. 981-986, Jun. 20-23, 1995.*
www.pointcloud.com/pages/Home.html, "Point Cloud", 5 pgs.
deskeng.com/3dd.htm, "Desktop Engineering, The Complete Computing Resource for Engineers", 1977 Helmers Publishing, Inc., 1 pg.
www.geometrixinc.com/mainwin.html, "Who says you can't build Rome in a Day?", 4 pgs.
www.inharmonytech.com/venus3d.index.html, "Introducing Venus 3D", 4 pgs.

(Continued)

*Primary Examiner* — Vu Le
*Assistant Examiner* — Andrae S Allison
(74) *Attorney, Agent, or Firm* — Blakely Sokoloff Taylor & Zafman LLP (57) ABSTRACT

A method and system to capture geometry of a three dimensional target while disambiguating multiple projected target elements. The system projects at least three light pattern elements toward a target at a diverse spacing relative to each other. The system captures at least one image of the target while illuminated by at least one of the pattern elements. The pattern elements are moved relative to the target. The system disambiguates one pattern element from any other contained within an image of the target, at least in part based on the diverse spacing. The system measures triangulation locations of points on a three-dimensional surface of the target.

19 Claims, 10 Drawing Sheets

U.S. PATENT DOCUMENTS

| | | |
|---|---|---|
| 5,101,442 A | 3/1992 | Amir |
| 5,125,043 A | 6/1992 | Karlsson |
| 5,131,844 A | 7/1992 | Marinaccio et al. |
| 5,132,839 A | 7/1992 | Travis |
| 5,135,309 A | 8/1992 | Kuchel et al. |
| 5,140,129 A | 8/1992 | Torii et al. |
| 5,153,728 A | 10/1992 | Nakayama et al. |
| 5,175,601 A | 12/1992 | Fitts |
| 5,184,733 A | 2/1993 | Arnarson et al. |
| D334,439 S | 3/1993 | Meyer et al. |
| 5,216,817 A | 6/1993 | Misevich et al. |
| 5,218,427 A | 6/1993 | Koch |
| D337,059 S | 7/1993 | Crafoord |
| D337,060 S | 7/1993 | Crafoord |
| 5,231,470 A | 7/1993 | Koch |
| 5,237,404 A | 8/1993 | Tanaka et al. |
| 5,247,555 A | 9/1993 | Moore et al. |
| 5,282,045 A | 1/1994 | Mimura et al. |
| 5,285,397 A | 2/1994 | Heier et al. |
| 5,289,264 A | 2/1994 | Steinbichler |
| D345,028 S | 3/1994 | Alvarez Baranga |
| 5,303,136 A | 4/1994 | Brown |
| 5,307,292 A | 4/1994 | Brown et al. |
| 5,315,512 A | 5/1994 | Roth |
| 5,335,317 A | 8/1994 | Yamashita et al. |
| 5,337,149 A | 8/1994 | Kozah et al. |
| 5,377,011 A | 12/1994 | Koch |
| 5,414,647 A | 5/1995 | Ebenstein et al. |
| 5,416,609 A | 5/1995 | Matsuda et al. |
| 5,432,622 A | 7/1995 | Johnston et al. |
| 5,453,784 A | 9/1995 | Krishnan et al. |
| 5,471,303 A | 11/1995 | Ai et al. |
| 5,531,520 A | 7/1996 | Grimson et al. |
| 5,559,334 A | 9/1996 | Gupta et al. |
| 5,585,926 A | 12/1996 | Fujii et al. |
| 5,592,563 A | 1/1997 | Zahavi |
| D377,932 S | 2/1997 | Schena et al. |
| 5,611,147 A | 3/1997 | Raab |
| 5,614,981 A | 3/1997 | Bryant et al. |
| 5,617,645 A | 4/1997 | Wick et al. |
| 5,621,529 A | 4/1997 | Gordon et al. |
| 5,627,771 A | 5/1997 | Makino |
| 5,636,025 A | 6/1997 | Bieman et al. |
| 5,646,733 A | 7/1997 | Bieman |
| 5,659,804 A | 8/1997 | Keller |
| 5,661,667 A | 8/1997 | Rueb et al. |
| 5,669,150 A | 9/1997 | Guertin et al. |
| 5,678,546 A | 10/1997 | Truppe |
| 5,689,446 A | 11/1997 | Sundman et al. |
| 5,701,173 A | 12/1997 | Rioux |
| 5,704,897 A | 1/1998 | Truppe |
| 5,708,498 A | 1/1998 | Rioux et al. |
| 5,724,264 A | 3/1998 | Rosenberg et al. |
| 5,745,175 A | 4/1998 | Anderson |
| 5,747,822 A | 5/1998 | Sinclair et al. |
| 5,748,194 A | 5/1998 | Chen |
| 5,771,310 A | 6/1998 | Vannah |
| 5,794,356 A | 8/1998 | Raab |
| 5,805,289 A | 9/1998 | Corby, Jr. et al. |
| 5,864,640 A | 1/1999 | Miramonti et al. |
| 5,870,220 A | 2/1999 | Migdal et al. |
| 5,880,846 A | 3/1999 | Hasman et al. |
| 5,894,529 A | 4/1999 | Ting |
| 5,898,508 A | 4/1999 | Bekanich |
| 5,907,359 A | 5/1999 | Watanabe |
| 5,907,640 A | 5/1999 | Delean |
| 5,910,845 A | 6/1999 | Brown |
| 5,926,782 A | 7/1999 | Raab |
| 5,944,598 A | 8/1999 | Tong et al. |
| 5,946,645 A | 8/1999 | Rioux et al. |
| D414,676 S | 10/1999 | Cieslikowski et al. |
| 5,978,748 A | 11/1999 | Raab |
| 5,988,862 A | 11/1999 | Kacyra et al. |
| 5,995,650 A | 11/1999 | Migdal et al. |
| 5,999,641 A | 12/1999 | Miller et al. |
| 6,016,487 A | 1/2000 | Rioux et al. |
| 6,028,672 A | 2/2000 | Geng |
| 6,037,584 A | 3/2000 | Johnson et al. |
| 6,040,910 A | 3/2000 | Wu et al. |
| D423,534 S | 4/2000 | Raab et al. |
| 6,057,909 A | 5/2000 | Yahav et al. |
| 6,078,701 A | 6/2000 | Hsu et al. |
| 6,091,905 A | 7/2000 | Yahav et al. |
| 6,100,517 A | 8/2000 | Yahav et al. |
| 6,111,582 A | 8/2000 | Jenkins |
| 6,137,896 A | 10/2000 | Chang et al. |
| 6,157,747 A | 12/2000 | Szeliski et al. |
| 6,192,393 B1 | 2/2001 | Tarantino et al. |
| 6,233,014 B1 | 5/2001 | Ochi et al. |
| 6,249,616 B1 | 6/2001 | Hashimoto |
| 6,298,569 B1 | 10/2001 | Raab et al. |
| 6,366,357 B1 | 4/2002 | Svetkoff et al. |
| 6,366,831 B1 | 4/2002 | Raab |
| 6,535,250 B1 | 3/2003 | Okisu et al. |
| 6,535,794 B1 | 3/2003 | Raab |
| D472,824 S | 4/2003 | Raab et al. |
| 6,549,288 B1 * | 4/2003 | Migdal et al. ............... 356/603 |
| 6,567,156 B1 | 5/2003 | Kerner |
| 6,592,241 B1 | 7/2003 | Kovacik et al. |
| D478,392 S | 8/2003 | Kovacik |
| 6,606,539 B2 | 8/2003 | Raab |
| 6,639,684 B1 | 10/2003 | Knighton et al. |
| 6,701,006 B2 | 3/2004 | Moore et al. |
| 6,775,403 B1 | 8/2004 | Ban et al. |
| 6,885,479 B1 | 4/2005 | Pilu |
| 7,019,278 B2 * | 3/2006 | Douglas ............... 250/214 R |
| 2002/0060669 A1 | 5/2002 | Sze |
| 2002/0163573 A1 * | 11/2002 | Bieman et al. ............... 348/46 |
| 2003/0063574 A1 | 4/2003 | Rafii et al. |
| 2003/0160970 A1 * | 8/2003 | Basu et al. ............... 356/601 |
| 2003/0231793 A1 | 12/2003 | Crampton |
| 2004/0125205 A1 * | 7/2004 | Geng ............... 348/142 |
| 2005/0103852 A1 | 5/2005 | Lucera et al. |
| 2005/0237581 A1 | 10/2005 | Knighton et al. |
| 2006/0072121 A1 | 4/2006 | Knighton et al. |

OTHER PUBLICATIONS

Internet World, Four Phographic VR Technologies, Dec. 7, 1998, vol. 4, No. 40, p. 37.
World Wide Web, ImageZoom 1.0 (Applet), Internet, Jun. 11, 1999, URL: http://www.digitalcats.com/US/search/rid00004281.html.
Be Here Corporation, 360 Video, Internet, Nov. 10, 2000, http://www.behere.com/process.htm.
Remote Reality, Company Overview/Products and Services, Internet.
QTVR Resources, Resources, Internet, Nov. 10, 2000, http://www.vet.cornell.edu/webweeks/tutorials,quicktime/qtvrresources.htm.
Dmoz, Open Directory Project, Internet, Nov. 10, 2000, http://dmoz.org/Arts/Photography/Panoramic/Cameras_and_Software/.
Kaidan Incorporated, New Product Announcements, Nov. 10, 2000, wysiwyg:///100/http://www.kaidan.com/alliances.html.
PCT International Search Report (dated Oct. 24, 2007), International Application No. PCT/US05/13640—International Filing Date Apr. 20, 2005, 10 pages.
"Desktop Three-Dimensional Scanner", U.S. Appl. No. 11/336,281, filed Jan. 20, 2006, First Named Inventor: Mark S. Knighton, 27 pages.
"Preliminary NextEngine 3D Communicator", User's Guide, NextEngine, Inc., Release Date: Jul. 2004, 49 pages.
Carrihill, Brian et al., "Experiments with the Intensity Ratio Depth Sensor", Computer Vision, Graphics and Image Processing 32, 1985, New York, New York, USA, (1985), 337-358.
Knighton, Mark S., et al., Non-Final Office Action dated May 29, 2008, U.S. Appl. No. 10/830,210, filed Apr. 21, 2004, 23 pgs.
Knighton, Mark S., et al., Non-Final Office Action mailed Nov. 26, 2008, U.S. Appl. No. 11/336,281, filed Jan. 20, 2006.
Knighton, Mark S., et al., Non-Final Office Action dated Feb. 10, 2011 for U.S. Appl. No. 12/702,959, 12 pages.

* cited by examiner

MULTIPLE LASER SCANNER

BACKGROUND

1. Field

The invention relates to capture of three dimensional data. More specifically, the invention relates to a high speed high resolution scanner to capture three dimensional data about a target.

2. Background

Various scanners exist to capture geometry of three dimensional objects. One class of such scanners uses a laser to project a light pattern onto a target and then determines the dimensions of the target from the interaction of the pattern with the target. As used herein, "target" refers to all or some portion of a three dimensional object. In theory, it would be faster to scan a target using multiple lasers. However, the introduction of multiple lasers creates ambiguity as it is often difficult or impossible to discern which laser is illuminating a pixel of a image sensing array.

To disambiguate multiple lasers, attempts have been made to encode the light pattern. In one such device, color is used to encode different laser stripes. In such a device, each laser emits a different colored stripe. The interaction of each laser stripe with a surface of the object can then be distinguished base on the color of the stripe. Such scanning methods, however, are heat intensive, expensive, and the number of lasers used is limited by the number of different colored lasers available. In other devices, a dot-dash pattern may be used to encode each laser stripe. Problems arise in such scanning methods, however, because when scanning different objects, light captured at the sensing array tends to fall off. Accordingly, it is difficult to discern whether the effect is due to the dot-dash patterned stripe or the geometry of the object. This can result in erroneous depth determinations.

It has further been a challenge of multiple laser scanners to maintain a small, compact size while still being able to capture images of relatively large targets. Generally, the larger the image to be captured, the larger the scanner must be.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The system operates on the principal that dimension data for a three-dimensional target may be determined by disambiguating light pattern elements from multiple sources projected on the target during a scanning period. In various embodiments, the light pattern elements may be laser spots, laser stripes, or may be some other light source focused to have a discernable edge. Laser stripes may be generated by, for example, passing a laser spot through a spreading lens or by rastering the laser spot. Because of the sharp edges possible by appropriately focusing laser light, lasers have been found to be a particularly desirable source of light pattern elements.

In one embodiment, a projector having at least three lasers emitting light pattern elements (e.g., laser stripes) with unique angles between each stripe may be panned across a target object at some constant angular speed. In another embodiment, the light pattern element may be a group of stripes, a group of spots, a group of stripes and spots or an interference pattern. An image sensing array (ISA) may be positioned within the scanner and programmed to take continuous images of the target. Each pixel of the ISA has a linear view to the target. Thus, the stripes from the lasers intersect the view of pixels of the ISA as the lasers pan across the object surface. As the elements (e.g., laser stripes) cross the view of the pixel on the target, the pixel is illuminated by the reflected light. The pixels capture images of the object while the object is illuminated by the stripes. Once a pixel is illuminated by at least two spots, a time separation between the two illuminations can be mapped to the respective illuminating laser with reference to the constant speed. This is true because a unique angle exists between each adjacent laser. This data may then be used to measure the location of the point of intersection on the three-dimensional surface of the target by triangulation.

As a general matter, it is only necessary for each pixel to be illuminated twice, but if more than two stripes illuminate the pixel, this additional information may be used for other purposes. For example, in an embodiment where a pixel is covered by three or four stripes, this over sampling may be used to reduce error and reject false points. In another embodiment, if the same point on the object is read multiple times a comparison may be made between the readings. If the readings differ by more than a threshold value, the information may be rejected. The threshold may be established based on tolerances of the system, maximum permissible error, etc. It is further possible to capture two points that do not map to adjacent lasers. In this case, the points may be characterized as unconfirmed and discarded.

Figure 1:
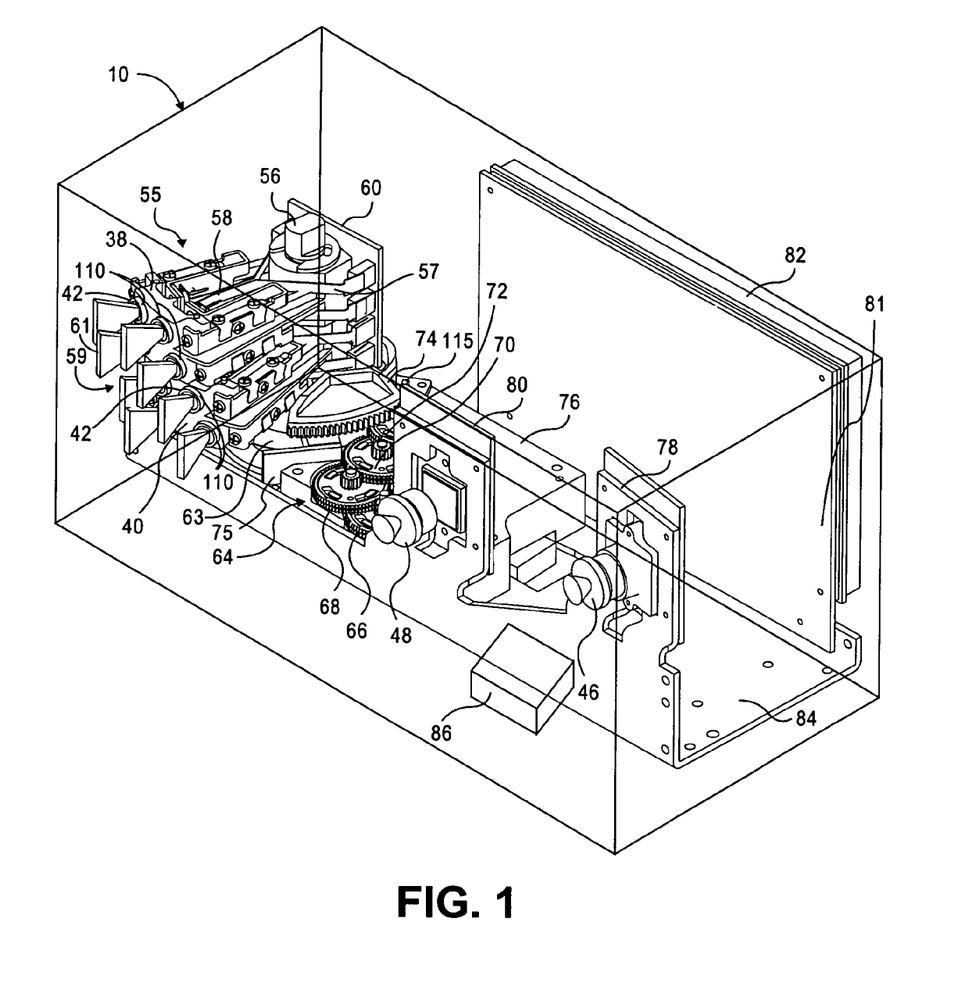
FIG. 1 is a perspective view of internal components of one embodiment of the invention.

FIG. 1 is a perspective view of internal components of a scanner of one embodiment of the invention. A mounting structure 84 provides a platform on which the other components of the scanner may be retained. In one embodiment, a pair of fixed focus cameras 46, 48 may be coupled to mounting structure 84. First camera 46 is retained by camera mounting plate 78. Similarly, second camera 48 is retained by second camera mounting plate 80. The cameras are retained in fixed relation relative to a projection unit 55. In one embodiment, first camera 46 is focused at a distance of eighteen inches from the scanner and second camera 48 is focused seven inches from the scanner.

While focal distances of seven inches and eighteen inches have been chosen, other focal distances are within the scope and contemplation of the invention. Cameras 46 and 48 include an image sensing array (ISA). In one embodiment, the ISA is an area charged coupled device (CCD) or a complementary metal oxide semiconductor (CMOS) sensor, having a focal zone and field of view directed at an angle towards a pattern projected by projection unit 55. In one embodiment the CMOS sensor may be a three megapixel area CMOS sensor such as the OVT 3620 available from Omnivision Technologies, Inc. of Sunnyvale, Calif. Higher or lower density sensors may be used in various embodiments of the invention. In one embodiment, cameras 46, 48 use the Omnivision chip and lenses from Genius Electronic Optical Co., Ltd of Taiwan under Part No. GS-8236D. In other embodiments, only a single camera may be used while in other embodiments, multiple cameras having a particular focal distance may be employed to provide for over sampling and reduce the occurrence of occlusions. In some embodiments, the cameras may be on a drive system and be able to change their focus to different ranges.

Circuit board mounting plate 81 extends from mounting structure 84 and provides a platform on which circuit boards necessary for operation of the system may be mounted. A circuit board 82 is mounted thereto. In one embodiment, there might be multiple circuit boards mounted to circuit board mounting plate 81 including a power board and a digital board. The power board supplies power to the various subsystems of the scanner. The digital board controls the operation of the scanner subsystems. These boards are described in greater detail with reference to FIG. 3.

Projection unit 55 includes a pair of manifolds 38, 40 mounted to a rotary axis 56 about which the manifolds can be rotated by a pan drive motor 76 via a gear box 64. Gear box 64 may include a number of composite gears 66, 68 and 70. Gear 72 engages a drive gear 74 mounted to the rotary axis. The gears may be molded out of plastic or any other suitable material. Drive gear 74 may be molded out of glass filled Acrylonitrile Butadiene Styrene (ABS) and may have a home blade (not shown) molded as a part thereof. The home blade is positioned to pass through optical interrupter 115. Optical interrupter 115 senses the blade and provides indication when the projection unit 55 is in a home position. Also attached to a rotary axis to move therewith is position encoder 63. In one embodiment, position encoder 63 may be a printed piece of material such as plastic having a plurality of high density lines printed thereon. In one embodiment, position encoder 63 has 360 lines per inch printed thereon. Alternatively, position encoder 63 may have 500 lines per inch printed thereon. A quadrature encoder 75 is positioned such that the printing on position encoder 63 passes through and is read by the quadrature encoder 75 as the projection unit 55 rotates about the axis 56. Through the quadrature encoder it is possible to discern to a high degree of accuracy the precise angular position of the projection unit 55.

As previously noted, a pair of manifolds 38, 40 are mounted to the rotary axis 56. In the shown embodiment, each manifold includes four ports 110 through which a light pattern element may be projected on a target. In other embodiments, more or fewer ports may be provided. For example, manifolds with eight, twelve, sixteen and thirty-two ports are contemplated. In one embodiment, laser diodes provide an optical communication with each port of each of the manifolds.

Figure 2:
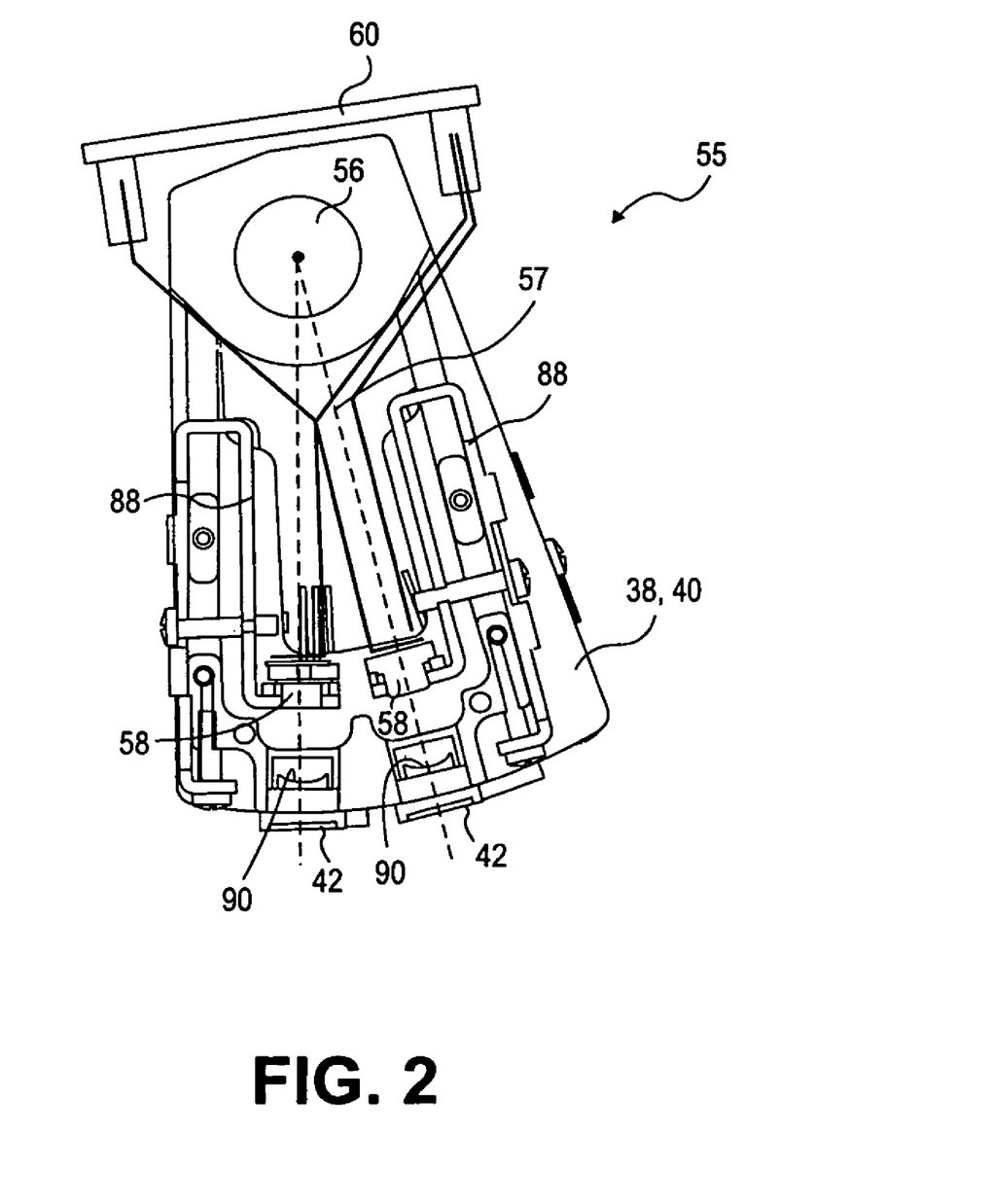
FIG. 2 is a top view of a manifold of one embodiment of the invention.

FIG. 2 is a top plan view of the manifold in one embodiment of the invention. In this view, only two channels for laser diodes in the manifold can be seen. The arrangement of the channels in the manifold ensure angular diversity between the projected light elements. As used herein, "angular diversity" means that either adjacent angles formed by the projection unit are different, or that for any group of projection elements selected, the angle formed is unique. At the limit, the angle formed by any two pairs of projected light pattern elements is unique. An example of the second case might be in a nine laser embodiment: given angles between respective adjacent lasers of 2°; 2°; 3°; 3°; 4°; 4°; 5°; 5°; for any group of three lasers, a unique angle exists. By using the laser groupings to establish uniqueness, greater laser density can be achieved without improving mechanical tolerances.

Laser diodes 58 are positioned to be at optical communication with collimating lenses 90 and spreading lenses 42. Collimating lens 90 focuses the emissions from laser diodes 58 into a laser spot. Spreading lens 42 then spreads the spot into a laser stripe which may be projected onto a target. Spring arms 88 permit the laser diode to be positioned within the channel to change the focus of the laser spot. Power lines 57 run from laser board 60 to the laser diodes to permit the lasers diodes to be powered and controlled during operation. The stripes emitted from the spreading lenses 42 projected back towards the axis of rotation converge to an axis substantially parallel to and possibly collinear with the axis of rotation 56 of the projection unit.

Returning again to FIG. 1 manifolds 38, 40 are identically configured. However, the positioning of the laser diodes within the manifolds permits the laser stripes emitted by the respective manifolds to be focused at eighteen or seven inches from the unit consistent with the focal distance of the first and second cameras respectively.

As noted above, manifolds 38 and 40 are manufactured such that pairs of ports define a unique angle relative to any other pair of ports for the particular manifold. In other embodiments, the ports may merely ensure that the angle between any two adjacent ports is different. This angular diversity facilitates disambiguation as discussed in more detail below. While four ports and correspondingly four lasers per manifold are shown in FIG. 1 manifolds permitting the use of more or fewer lasers are contemplated. For example, manifolds for twelve or sixteen lasers might be used in alternative embodiments of the invention. The larger the number of lasers, the faster it is possible to scan a particular target. The limitations on the number of lasers is constrained by manufacturing tolerances and the overall size of the unit desired.

Collimating lens 90 may be a collimating lens, such as that available from Union E-O Technology Co., Ltd of Taiwan available under the Part Number LC-5. In one embodiment, spreading lens 42 may be a customized spreading lens having an aspheric profile. Spreading lens 42 may be customized so as to create a substantially uniform laser stripe over the desired field of view. In one embodiment, spreading lens 42 is customized to make the laser plane exactly as long as needed for the particular laser and collimating lens combination, so as not to waste any laser power or miss the edges of the field of view. In another embodiment, spreading lens 42 may be customized to have a particular size which allows for multiple lasers to be packed close together within the manifolds. In one embodiment, spreading lens 42 may be made of a plastic material. In some embodiments, a glass lens or diffraction grating may be used to create a laser stripe. In an alternative embodiment, a galvo-driven mirror or other form of rastering may be used to create a laser stripe. In one embodiment, the laser stripe 61 to be panned across the target. In one embodiment, laser plane 61 may span the entire height of the target such that the entire target may be captured in one sweep across the target. In one embodiment, the spread of the laser stripe at the focal distance of the cameras in conjunction with the field of view of the cameras at that distance defines the size of target that can be captured.

In one embodiment, first camera 46 having a focal length of eighteen inches may be aligned to laser projector 55 by positioning it at a similar height to manifold 38 from the bottom of housing 28. In an embodiment wherein lower unit 59 of laser projector 55 includes laser diodes having a focal length of seven inches, second camera 48 having a focal length of seven inches is positioned at a similar height to manifold 40. Each laser diode may then be mapped to a camera having a similar focal length. Aligning the laser diodes and cameras in this manner reduces the likelihood of occlusions (e.g. horizontal features on the target) during image capture.

One factor in the quality of the capture is the angle between the pixel line of sight and the projected laser stripes. Thus selection of a distance between each camera and laser diode involves balancing factors such as image resolution, likelihood of occlusion and device size. Smaller distances result in narrower angles defined by an intersection between each pixel and laser plane. A narrower angle reduces the likelihood of occlusion during image capture. A narrower angle, however, reduces the resolution of the image. Thus, where a higher resolution is desired, it may be desirable to increase the distance between the camera and laser diode so that the angle between the pixel and laser plane is increased. It is recognized, however, that increasing the distance may in turn increase the device size. Angles in the range of about 15°-25° have been found satisfactory for five thousandths of an inch resolution and permit a sufficiently compact overall device size.

In an alternative embodiment, spreading lens 42 may be omitted from the laser projector such that a spot is panned across target 26. In said embodiment, the spot may be panned across target 26 at a predetermined height. Another axis of mobility is included within the scanner 10, such as a vertical drive, so that the spot may be moved vertically to a second height and swept across target 26 at this second height. This process continues until the entire target 26 is scanned. Scanning with a laser spot is inherently slower than using a stripe.

A fan 86 is provided for cooling pan drive motor 76. Fan 86 may be mounted to the base portion of structure 84. Fan 86 may be any commercially known fan dimensioned to fit within scanner 10. In one embodiment, fan 86 may be used to cool other internal components, including but not limited to, the laser diodes, a digital board 94 (See FIG. 3) and power board 82 (See FIG. 3). Although the device will not be damaged by operation without fan 86, cooling of the device in this manner is believed to facilitate thermal stability.

Figure 3:
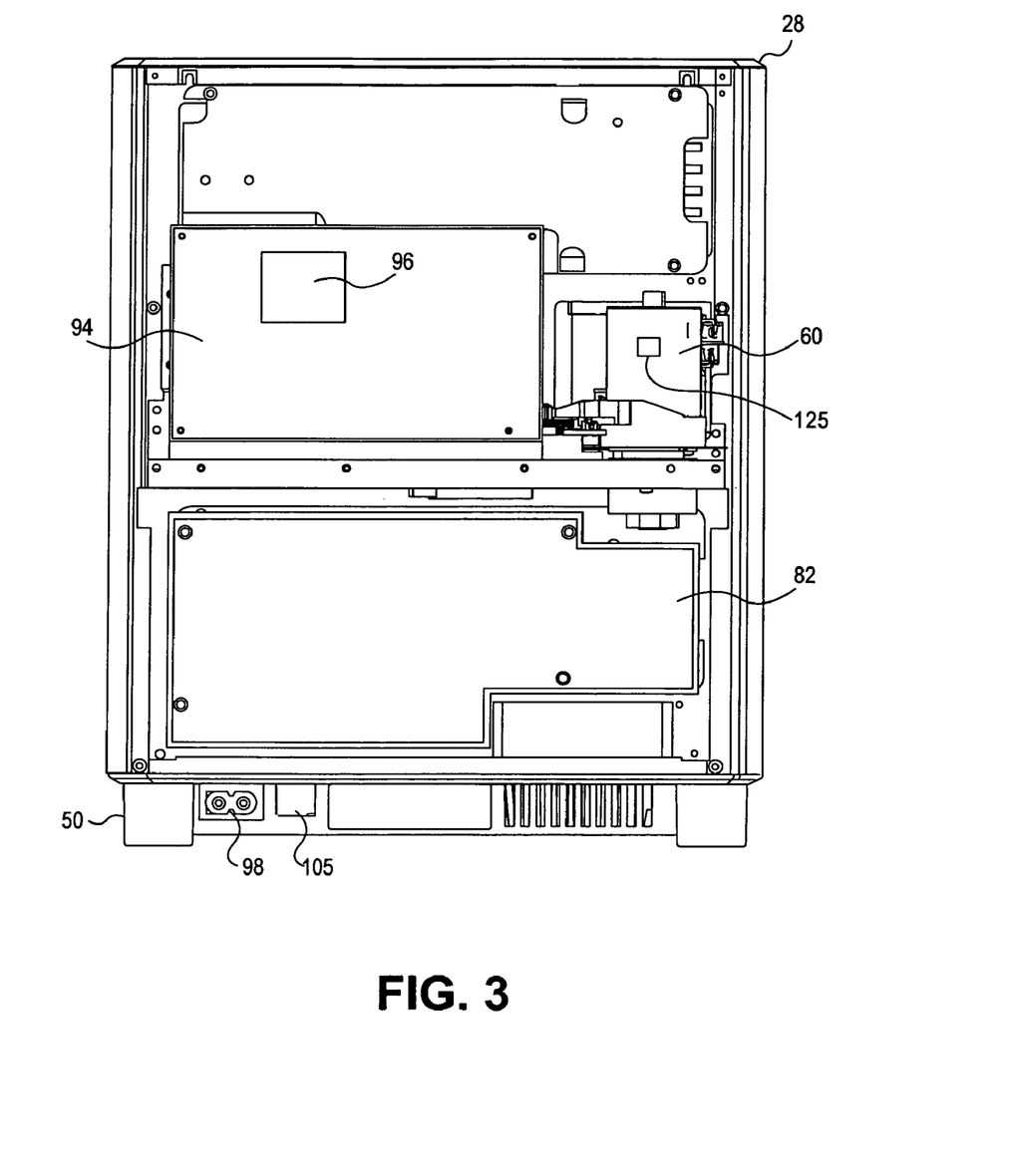
FIG. 3 is a rear view of a multiple laser scanner of one embodiment of the invention with a portion of the housing removed.

FIG. 3 is a rear plan view of a multiple laser scanner of one embodiment of the invention with a portion of the housing removed. A port 98 is formed within base 50 for insertion of a power cord. A universal serial bus (USB) port 105 may also be provided to allow connection to a host processor, such as a personal computer (PC), work station, lap top computer or other intelligent device capable of processing the data captured by the scanner. However, other connectivities such as IEEE 1394 are also expressly contemplated.

A digital board 94 having a primary microprocessor 96 is vertically positioned along a back side of scanner 10. Primary microprocessor 96 may be used to encode all the USB communications with the host e.g., PC. In one embodiment, microprocessor 96 is a ZR4201 processor available from Zoran Corporation of Sunnyvale, Calif. Microprocessor 96 may further be used to control all standard components of scanner 10, including but not limited to, cameras 46, 48 and pan drive 76. In another embodiment, microprocessor 96 issues commands to laser board 60, such as, for example, when the lasers are to be turned on and off.

Laser board 60 is vertically positioned along the back side of scanner 10. In one embodiment, laser board 60 is connected to first laser projection unit 55 and in turn the laser diodes. In one embodiment, laser board 60 includes a built in microprocessor 125 to control an output of the laser diodes. Typically, driving a laser diode involves determining an optical output of the diode and tuning the power accordingly so that the diodes do not run to a point where they burn themselves out. Typical analog circuits are limited to resistor tolerances. As such, circuit to circuit, each laser driven by an analog control circuit will be driven at slightly less than its maximum capacity. In one embodiment, microprocessor 125 of laser board 60, however, monitors the output of all the lasers and drives an input current to each laser independently. This allows for tuning of the lasers to have an optimal output. Since the microprocessor 125 is able to monitor diode output, power to the diodes may be maximized without burning out the diodes. This feature is also advantageous with respect to disambiguation since it is desirable to optimize diode output so that each pattern element has the same intensity when hitting target 26. In another embodiment, the microprocessor 125 may be used for recording a history of laser usage and output. The history may then be stored locally to the laser board for future applications.

Power board 82 may be vertically positioned along the back side of scanner 10. Vertically positioning the circuit board results in a smaller footprint of the device. Power board 82 is connected to a portion of scanner 10 below what is illustrated in FIG. 1. Power board 82 may be connected to an internal frame of scanner 10 by any suitable securing mechanism, including but not limited to, those previously discussed. In one embodiment, power board 82 accepts between 110 volts and 220 volts of power to scanner 10. This permits the same unit to be used in the United States as well as abroad. In one embodiment, power board 82 includes a built in fluorescent bulb ballast (not shown) to facilitate driving of fluorescent bulbs (shown in FIG. 5) used for texture lighting. Alternatively, the fluorescent bulb ballast may be external to power board 82. In other embodiments, the texture lighting and the fluorescent bulb ballast are omitted entirely.

Figure 4:
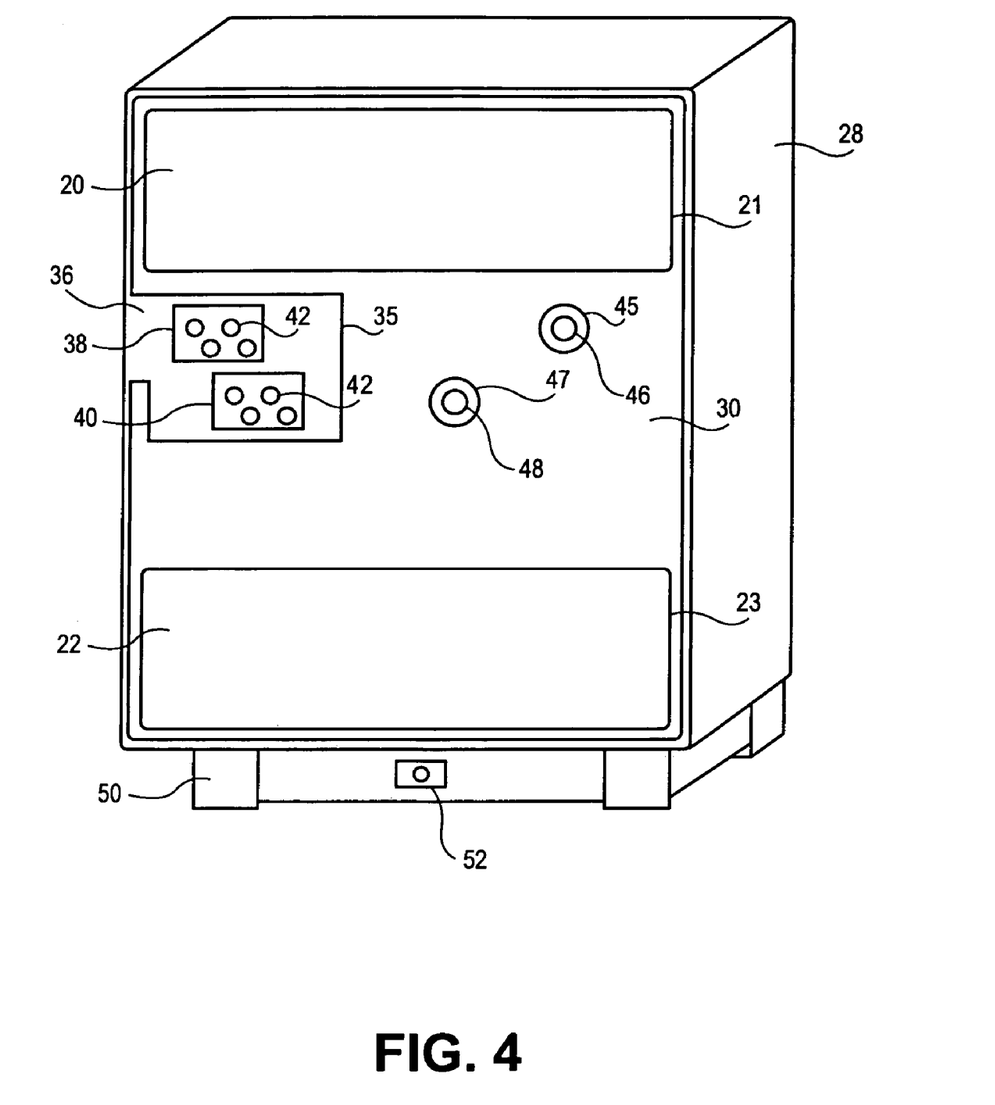
FIG. 4 is a front view of a multiple laser scanner of one embodiment of the invention with a portion of the housing removed.

FIG. 4 is a front view of the multiple laser scanner of one embodiment of the invention. A housing 28 is connected to a base 50. In one embodiment, housing 28 may be fixedly connected to base 50 to reduce manufacturing costs associated with reconfiguration of focal parameters due to movement of the projector and ISA in relation to object 26. Housing 28 may be connected to base 50 by any suitable securing mechanism, including but not limited to, screws, bolts, adhesives or any similar securing mechanism. In an alternative embodiment, housing 28 may be rotatably connected to base 50. Housing 28 may be dimensioned such that it is suitable to be used upon a desktop or table top. In one embodiment, housing 28 has a projected footprint of approximately 8.8"× 3.6" or less than 32 sq inches. In one embodiment, the scanner has a height of 10.9". In one embodiment, housing 28 may be formed from aluminum sheets formed to the desired shape. Housings made of plastic or other metal are also within the scope and contemplation of the invention. Base 50 includes a port 52 allowing for a turntable or other orientation fixture (not shown). This port may permit wired connection or wireless connection such as infrared (IR) or radio frequency (RF) signaling to the turntable. In this manner, the primary microprocessor 96 of the scanner can send commands to control the turntable.

Housing 28 includes a face plate 30 dimensioned to form a front surface of housing 28. In one embodiment, face plate 30 defines a projection window 35, image capture windows 45, 47 and texture light source windows 21, 23. Projection window 35 and image capture windows 45, 47 may be aligned with one another such they are substantially the same height from a bottom of housing 28. Texture light source window 21 may extend across a top portion of face plate 30 and texture light source window 23 may extend across a bottom portion of face plate 30 such that projection window 35 and image capture windows 45, 47 are positioned between texture light source windows 21, 23. Face plate 30 may be secured to housing 28 by any suitable securing mechanism, including but not limited to, screws, bolts, adhesives, snap fit or any similar securing mechanism. In one embodiment, face plate 30 may be molded out of polycarbonate. Face plates made of other plastics or partial metal or partially plastic are also within the scope and contemplation of embodiments of the invention.

A flat lens 36 may be positioned within projection window 35. Alternatively, lens 36 may be a cylindrical lens. A light diffusing lens 20 may be positioned within light source window 21. A second light diffusing lens 22 may be positioned within light source windows 23. Lenses 36, 20, 22 may be dimensioned to be snap fitted within windows 35, 21, 23 respectively. In an alternative embodiment, lenses 36, 20, 22 may be connected along a perimeter of windows 35, 21, 23 respectively by screws, bolts, hook and latch, adhesives, or any similar securing mechanism suitable for securely holding the lenses within the windows. A material used for the lenses may vary from one embodiment to the next, depending on the optics employed within the housing.

First manifold 38 which forms part of the projection unit is positioned behind flat lens 36. As previously discussed, the projection unit may further include a second manifold 40 positioned behind flat lens 36. Second manifold 40 may be of substantially the same size and shape as first manifold 38. First manifold 38 may be positioned behind an upper portion of flat lens 36. A laser spreading lens 42 resides within each port of each manifold 38. Second manifold 40 may be positioned behind a lower portion of flat lens 36 such that the first manifold is approximately in line with the first camera 46 and the second manifold is approximately aligned with the second camera 48. In an alternative embodiment, scanner 10 may include any number of image capture windows and cameras.

Figure 5:
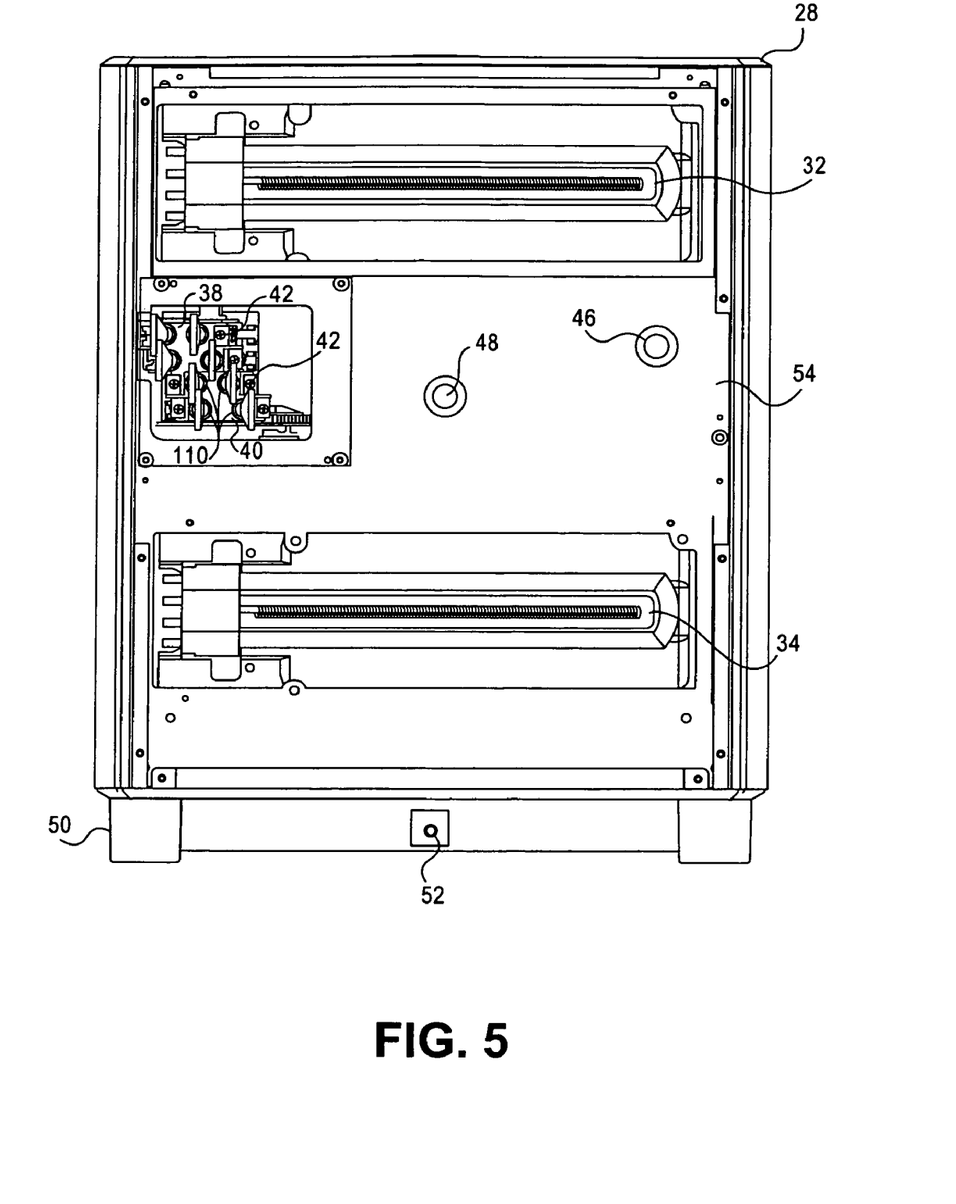
FIG. 5 is a front view of a multiple laser scanner of one embodiment of the invention.

FIG. 5 is a front plan view of a multiple laser scanner of one embodiment of the invention with a portion of housing 28 removed. In particular, face plate 30 is removed to illustrate underlying features of scanner 10. A light bulb mounting plate 54 is shown connected to housing 28. Light bulb mounting plate 54 may be connected to housing 28 by any suitable securing mechanism, including but not limited to, screws, bolts, adhesives or any similar securing mechanism. In one embodiment, mounting plate 54 is molded out of ABS. Mounting plates made of other plastics or metal are all within the scope and contemplation of the invention.

A light bulb 32 is mounted to an upper portion of light bulb mounting plate 54. A second light bulb 34 is mounted to a lower portion of light bulb mounting plate 54. Light bulbs 32, 34 may be mounted to mounting plate 54 with any suitable light bulb mounting structure, including, but not limited to, a light bulb socket attached to mounting plate 54. In one embodiment, light bulbs 32, 34 may be fluorescent light bulbs, such as is commercially available thirteen watt fluorescent bulb available from Greenlite Lighting Corporation of Quebec, Canada, available under the part number CFL-13W-TT. These bulbs are used to provide diffused light to permit texture capture. By having a bulb above the cameras 46, 48 and a bulb below the cameras 46, 48, shadowing of the targets is reduced. In an alternative embodiment, light bulbs 32, 34 may be any type of light bulb suitable for providing a sufficient flash for cameras 46, 48. It has been found that the relative length of the fluorescent bulbs helps to diffuse the light, reduces glare, and improves the quality of texture data captured by the scanner.

Figure 6:
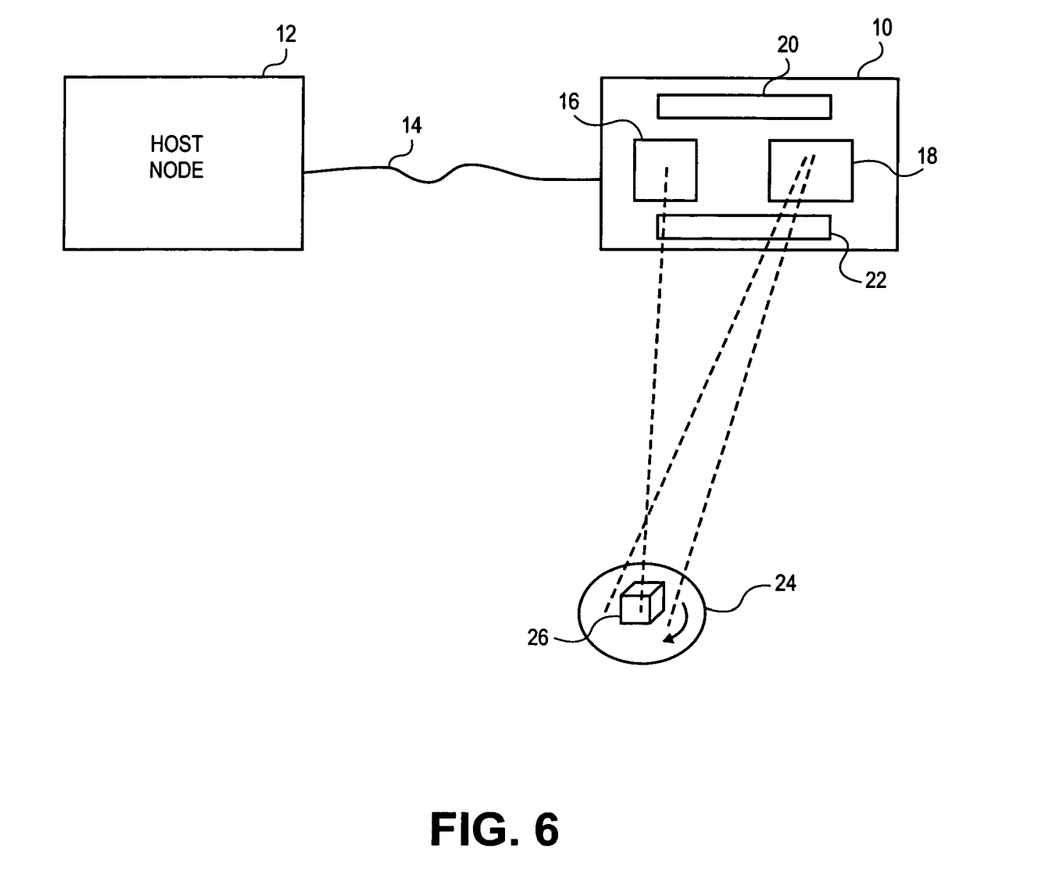
FIG. 6 is a block diagram of a system of one embodiment of the invention.

FIG. 6 is a block diagram of a system of one embodiment of the invention. A scanner 10 is coupled to a host node 12. This coupling may be by a bus 14 such as the Universal Serial Bus (USB), IEEE 1394 bus, or any other suitable data transfer system. It is also within the scope and contemplation of the invention for scanner 10 to communicate with host node 12 via a wireless connection. Host node 12 may be a personal computer (PC), a work station, an internet appliance, or any other device that provides sufficient intelligence and processing power to render images from the data obtained by the ISA. The scanner 10 captures image data and may forward it to host node 12 for rendering. In some embodiments, the processing on scanner 10 may be limited, permitting lower cost construction. In an alternative embodiment, the image data may be retained for processing by scanner 10.

Scanner 10 includes the projector within projection region 16 to project light pattern elements toward a target object 26 positioned on a turntable 24 remote from scanner 10. Scanner 10 further includes an image capture region 18. An ISA is positioned within image capture region 18.

The ISA captures an image of object 26 within the field of view. In one embodiment, the ISA may capture an image of target 26 having an area of 5.1"×3.8" inches or fewer at a distance of seven inches without resolution of 0.005". In an alternative embodiment, the ISA may capture target 26 fitting within a 10.1"×13.5" area at eighteen inches from the scanner with a resolution of 0.012".

In one embodiment, image capture involves two phases. The first phase includes capturing a texture map of object 26. The second phase includes capturing a geometry of object 26. As used herein, image may refer to the geometry, the texture map, or both. This data set is then processed by host node 12 or alternatively, scanner 10. In one embodiment, turntable 24 may be of the type described in U.S. Pat. No. 6,530,550 assigned to the assignee of the instant application. However, any suitable turntable may be used.

Scanner 10 further includes light diffusing lenses 20, 22 positioned over an underlying light source. Diffusing lenses 20, 22 disperse light from the underlying light source directed toward object 26. The diffusing lenses 20, 22 and light source provide a consistent light source for capture of the image texture. Diffusing lenses 20, 22, may be any suitable material capable of dispersing light, such polycarbonate plastic with a wave pattern molded therein to facilitate diffusion of the light.

Figure 7:
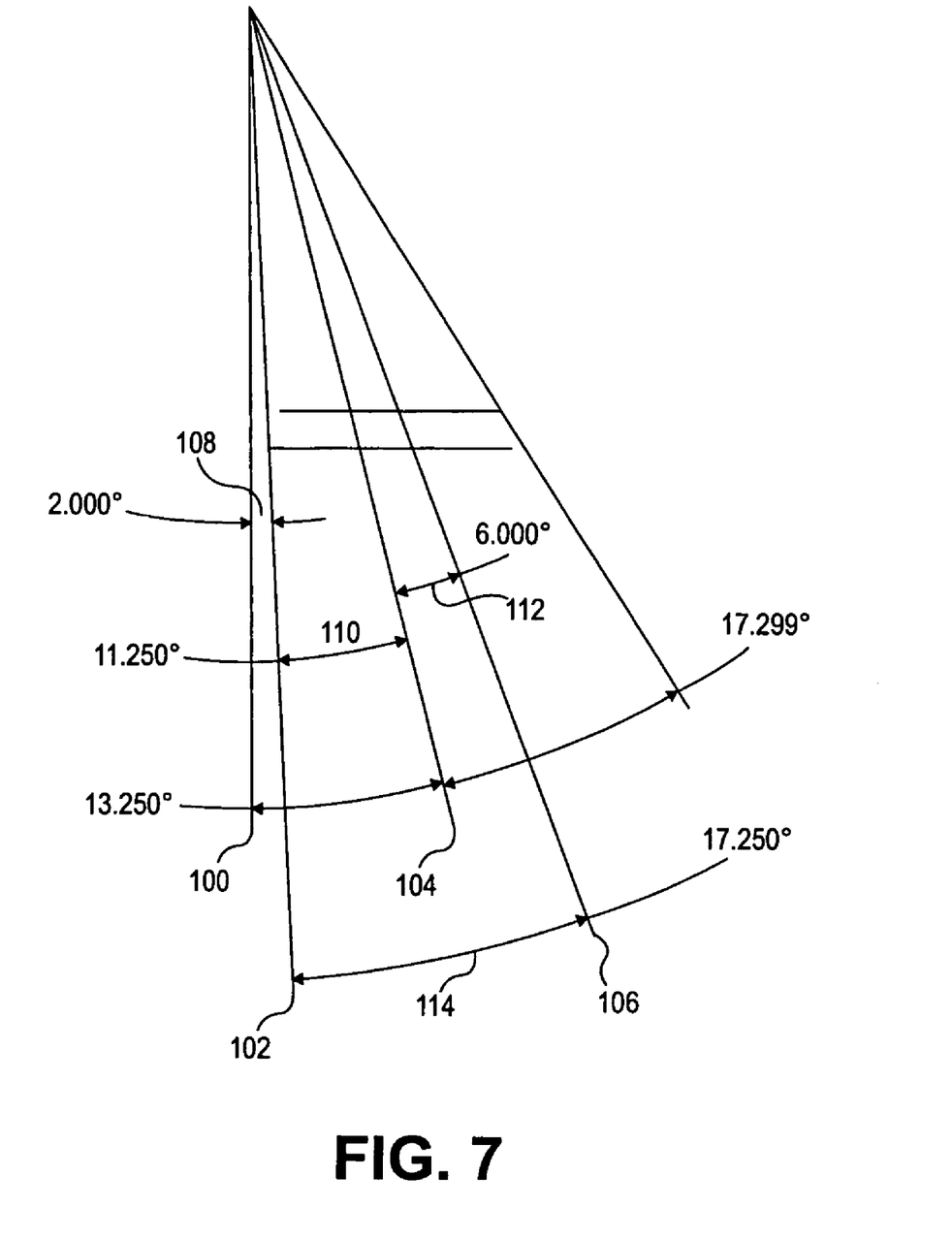
FIG. 7 is a diagram of a scan pattern of one embodiment of the invention.

FIG. 7 shows a diagram of a scan pattern of one embodiment of the invention. The scan pattern illustrates a diverse angular spacing between adjacent light pattern elements. As previously set forth, angular spacing refers to a different angle created between any two adjacent lasers planes or a unique combination of angular spacings between groups of laser planes relative to a first axis (e.g. convergence axis 56 of the laser planes). FIG. 7 illustrates an embodiment having four laser planes, 100, 102, 104 and 106. In this aspect, angular diversity is created by aligning four laser diodes within, for example, first manifold 38 of first laser projector 55 such that a first laser plane 100 and a second laser plane 102 emitted from a first laser diode and a second laser diode respectively are closer together than a third laser plane 104 emitted from a third laser diode and a fourth laser plane 106 emitted from a fourth laser diode. In this way, a unique angle between any pair of laser planes is formed. One can observe that any pairwise combinations e.g., 1 and 3, 2 and 4, or any adjacent pair still define a unique angle. It is within the scope and contemplation of the invention to align more than four laser diodes within a manifold in the above manner to increase the speed of the scanner.

In one embodiment, angle 108 between first laser plane 100 and second laser plane 102 may be 2°. A second angle 110 between second laser plane 102 and third laser plane 104 may be 11.25°. A third angle 112 between third laser plane 104 and fourth laser plane 106 may be 6°. In an alternative embodiment, only one of angles 110, 112, 114 and 116 may be different than an adjacent angle. Still further, angles 110, 112, 114 and 116 may be of any degree such that they provide a recognizable pattern of laser planes. Angle 114 may be 17.25 degrees and represents approximately half the camera field of view. The remaining lines and angles are included to illustrate the extent to which one must map to completely read each laser. While particular angles are set forth, other angles could be used as long as angular diversity is maintained.

Laser planes 100, 102, 104 and 106 may then be panned across target 26 by rotating projection unit 55 about a second axis (e.g., the axis of rotation 55) substantially parallel to the first axis. Alternatively, laser planes 100, 102, 104 and 106 may be moved across the target object by rotating turntable 24. In still another embodiment, laser planes 100, 102, 104 and 106 may be virtually moved across the target object by sequentially projecting the planes in different locations. As used herein, movement "relative" to the target means either the pattern element moves, the target moves, or both.

As illustrated in FIG. 7, the largest angle 110 is 11.25 degrees which is about one third the view of camera 46. Since angle 110 causes a divergence of about one third the field of view of the camera, the sweep angle required to capture at least two points for every pixel in the camera's field of view is less than the entire range of motion. Thus, an entire image may be captured when panning begins just before laser planes 106 and 104 enter the field of view and continues until laser plane 102 reaches a point just past the center of the field of view. Thus, by making at least two laser planes 110 and 102 dose together and having a second pair of laser planes 104 and 106 a half to a third the field of view away and separated to ensure the first pair may be easily disambiguated, faster scanning may be achieved. The above-description would further apply in an embodiment incorporating more than four lasers however the largest angle would be smaller. For example, in an embodiment having eight lasers, the largest angle would be about one quarter the field of view.

In an alternative embodiment, a combination of angles splitting a difference between optimal angles for short and long focal ranges is contemplated. It is further contemplated, that in embodiments having cameras with smaller fields of view, laser diodes may be aligned within the manifold to create more laser planes near a center axis of the field of view.

In another embodiment where the laser planes are substantially parallel and are linearly translated relative to the target, the light elements have a diverse linear spacing. In this aspect, distances between adjacent laser planes are different from one pair to the next. In an alternative embodiment, not all distances between laser plane pairs is different. Thus, instead of disambiguating based on unique angles between each laser plane as described above, laser planes are distinguished based on a unique linear separation between each plane.

Figure 8:
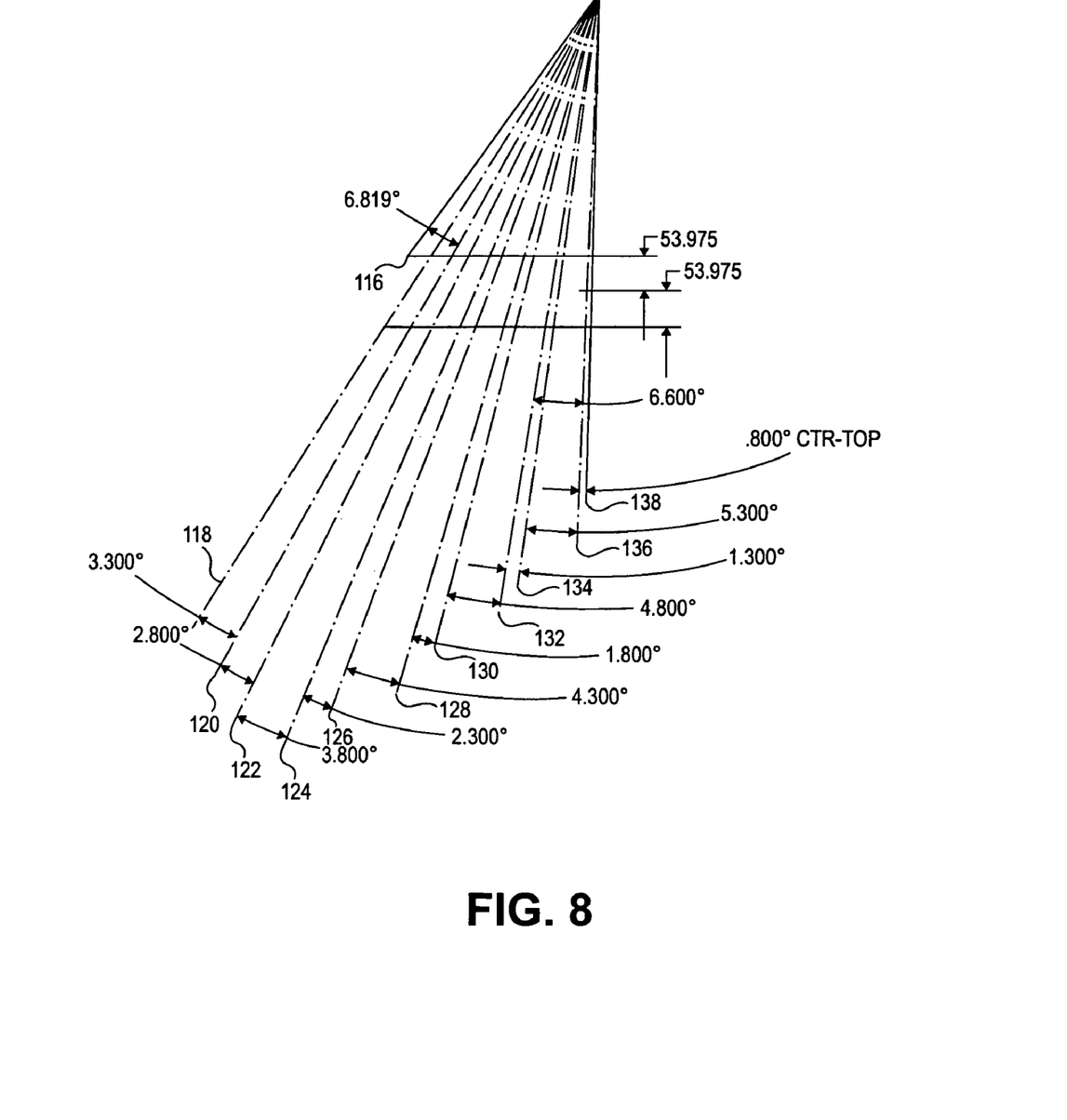
FIG. 8 is a diagram of a scan pattern of one embodiment of the invention.

FIG. 8 shows a diagram of a scan pattern of one embodiment of the invention using more than four laser planes. In this embodiment, 12 lasers planes 116, 118, 120, 122, 124, 126, 128, 130, 132, 134, 136, 138 are shown. Each angle between adjacent laser planes is different. In an alternative embodiment, some of the angles between adjacent laser planes may be the same. In one embodiment, groups of laser planes having unique angular combinations may be used to ensure differences recognized between angles during analysis is due to angular diversity and not error. In this aspect, one group may include angles of one degree, one degree, one degree and three degrees while a second group may be angles of one degree, one degree, one degree and five degrees. The groups may then be disambiguated based on the last angle of the group.

Figure 9:
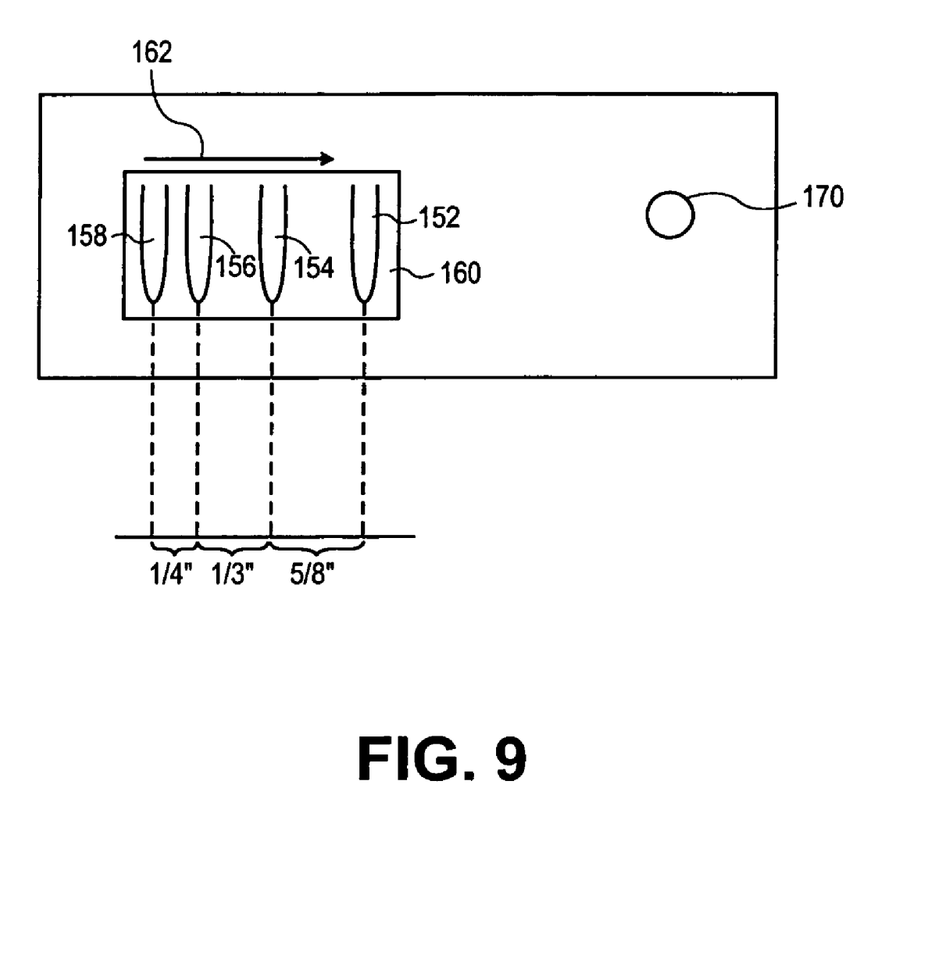
FIG. 9 is a schematic diagram of a scanner of an alternative embodiment of the invention.

FIG. 9 is a schematic diagram of a scanner of an alternative embodiment of the invention. A manifold 160 retains four laser diodes 152, 154, 156, 158 that exhibit linearly diverse spacing. In this example, ¼" between lasers 152 and 154, ⅓" between lasers 154 and 156, and ⅝" between lasers 152 and 154. A camera 170 is retained in a fixed position in a housing. A linear drive 162 drives the manifold 160 along a linear path to expose target (not shown) to the light elements emitted by the lasers. The lasers 152 and 158 may be lensed as described in connection with the angular diverse embodiment above. In fact, other than changing the diversity from angularly diversity with a rotational drive to linear diversity with a linear drive, the all remaining principles apply.

Figure 10:
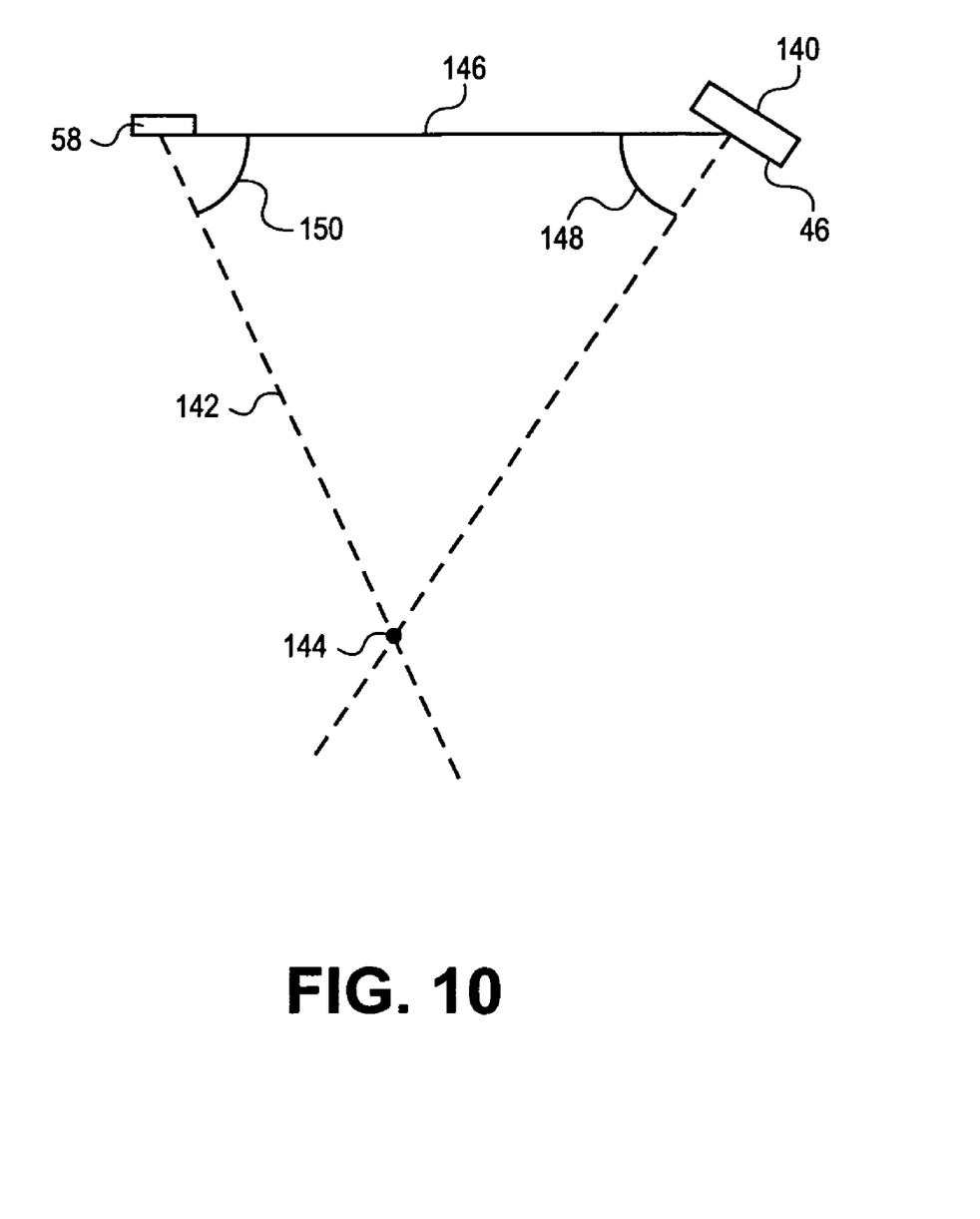
FIG. 10 is a diagram of a triangulation technique according to one embodiment of the invention.

FIG. 10 is a diagram of a triangulation technique according to one embodiment of the invention. In one embodiment, a location of points on a surface of three-dimensional target 26 may be measured by triangulation. Although in embodiments of the invention, at least two laser planes are considered in calculating each point on the surface of target object 26, the instant description will describe triangulation with respect to a single laser plane for simplicity. In this aspect, a laser plane 142 extends from laser diode 58 towards a target object. A focal line of a pixel 140 of camera 46 is further shown intersecting laser plane 142 at a point 144 on an object surface. As previously discussed, a distance between laser diode 58 and camera 46 is known, thus from this information a distance illustrated as line 146 between laser plane 142 and pixel 140 may be determined. A triangle is therefore defined by pixel focal line 140, laser plane 142 and distance line 146. Information obtained by the quadrature sensor may be used to determine an angle 150 formed between distance line 146 and laser plane 142. Moreover, since camera 46 is maintained in fixed relation to projection unit, an angle 148 formed between distance line 146 and the focal line of pixel 140 may be accurately determined. Thus, since two angles 148 and 150 and distance 146 are known, triangulation may be used to measure the location of point 144 on the object surface. This process may then be repeated for each point on the object surface. The points may then be integrated to form an image of the three-dimensional object.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense

What is claimed is:

1. A method comprising:
projecting at least three light pattern elements toward a target at a diverse angular spacing relative to each other about a first axis;
capturing at least one image of the target while illuminated by at least one of the pattern elements;
moving the pattern elements relative to the target consistent with rotation of the projection about a second axis;
disambiguating one pattern element from any other contained within an image of the target, at least in part based on the diverse angular spacing; and
measuring by triangulation a location of points on a three-dimensional surface of the target.

2. The method of claim 1 wherein the diverse angular spacing is manifest as one of:
a unique angular spacing between any two adjacent pattern elements, and a unique combination of angular spacing between groups of pattern elements.

3. The method of claim 1 further comprising:
arranging the diverse angular spacing of the pattern elements to reduce an amount of rotation required to measure the dimensional surface of the target.

4. The method of claim 1 wherein the first and second axes are substantially parallel.

5. The method of claim 1 wherein measuring comprises:
measuring each of at least two pattern elements projected upon a same location on the target by triangulation.

6. The method of claim 1 wherein moving the pattern elements relative to the target comprises at least one of:
moving the light source, moving an element in an optical path, moving the target, or sequentially projecting images of the pattern elements in different locations.

7. The method of claim 1 further comprising:
correlating images of a surface texture of the target to the three-dimensional measurements of target surface.

8. The method of claim 1 wherein at least one pattern element is one of:
a stripe, a spot, a group of stripes, a group of spots, a group of stripes and spots, and an interference pattern.

9. A method comprising:
projecting at least three light pattern elements towards a target, the light elements having diverse linear spacing within a projection phase;
capturing at least one image of the target while illuminated by at least one pattern element;
linearly translating the pattern elements relative to the target;
disambiguating one pattern element from any other contained within an image of the target at least in part based on the diverse linear spacing of the pattern elements; and
measuring by triangulation a location of points on a three-dimensional surface of the target.

10. The method of claim 9 further comprising:
arranging the diverse linear spacing to reduce the translation required to capture the surface of the target.

11. The method of claim 9 wherein measuring comprises:
measuring by triangulation each of at least two pattern elements projected upon a same location on the target.

12. The method of claim 9 further comprising:
correlating a surface texture of the target to measurements of the three-dimensional target surface.

13. The method of claim 9 wherein the early diverse spacing is manifest as a one of:
unique linear spacing between adjacent pattern elements or a unique combination of linear spacing between groups of pattern elements.

14. A system comprising:
a projection unit to project at least three diversely spaced light pattern elements toward a target;
an image sensing array to capture light from the projection unit reflected by the target;
a processor to disambiguate the light pattern elements based on a timing between illuminations of a pixel in the image sensing array.

15. The system of claim 14 wherein the projection unit comprises:
a plurality of laser diodes retained to project laser stripes at angularly diverse spacing.

16. The system of claim 15 further comprises:
a rotary drive to rotate the projection unit about an axis.

17. The system of claim 14 wherein the projection unit comprises:
a plurality of laser diodes retained in a linearly diverse spacing.

18. The system of claim 14 wherein the light pattern elements are simultaneously projected.

19. The system of claim 14 wherein the image sensing array is an area array.

* * * * *

UNITED STATES PATENT AND TRADEMARK OFFICE
CERTIFICATE OF CORRECTION

| | | |
|---|---|---|
| PATENT NO. | : 7,995,834 B1 | Page 1 of 1 |
| APPLICATION NO. | : 11/336216 | |
| DATED | : August 9, 2011 | |
| INVENTOR(S) | : Mark S. Knighton et al. | |

It is certified that error appears in the above-identified patent and that said Letters Patent is hereby corrected as shown below:

Claim 12, Column 12, line 19, please delete "early" and insert --linearly--.

Signed and Sealed this
Eleventh Day of October, 2011

David J. Kappos
*Director of the United States Patent and Trademark Office*